United States Patent
Hanna et al.

(10) Patent No.: US 7,178,021 B1
(45) Date of Patent: Feb. 13, 2007

(54) METHOD AND APPARATUS FOR USING NON-SECURE FILE SERVERS FOR SECURE INFORMATION STORAGE

(75) Inventors: Stephen R. Hanna, Bedford, MA (US); Radia J. Perlman, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/517,410

(22) Filed: Mar. 2, 2000

(51) Int. Cl.
*G06F 17/30* (2006.01)

(52) U.S. Cl. ............... 713/155; 713/150; 713/151
(58) Field of Classification Search ........... 713/165, 713/150, 151, 155
See application file for complete search history.

(56) References Cited

U.S. PATENT DOCUMENTS

| | | | |
|---|---|---|---|
| 5,052,040 A * | 9/1991 | Preston et al. | 713/165 |
| 5,495,533 A * | 2/1996 | Linehan et al. | 713/155 |
| 5,748,735 A * | 5/1998 | Ganesan | 713/165 |
| 5,787,169 A * | 7/1998 | Eldridge et al. | 713/165 |
| 5,787,175 A * | 7/1998 | Carter | 713/165 |
| 5,835,601 A * | 11/1998 | Shimbo et al. | 713/165 |
| 5,923,756 A * | 7/1999 | Shambroom | 713/156 |
| 6,185,681 B1 | 2/2001 | Zizzi | 713/165 |

OTHER PUBLICATIONS

Alfre J Menezes, Paul C. van Oorschot, Scoot A. Vanstone, "Handbook of Applied Cryptography", 1997, CRC Press, p. 364.*

(Continued)

*Primary Examiner*—David Jung
(74) *Attorney, Agent, or Firm*—Chapin IP Law, LLC; Barry W. Chapin, Esq.

(57) ABSTRACT

A method and apparatus for utilizing a non-secure file server for storing and sharing data securely only among clients and groups authorized to read and modify the data. A first client that desires to store data on the file server encrypts the data with a first encryption key having an associated first decryption key. The client encrypts the first decryption key with a second encryption key having an associated second decryption key known to the first client. Additionally, the first decryption key is encrypted with respective encryption keys of other clients or groups intended to have access to the data stored on the file server and the clients and groups retain their respective decryption keys. All of the encrypted first decryption keys are stored within an access control list in association with the encrypted data on the non-secure file server. In response to an indication that the data should be transmitted to one of the clients, the file server returns to the client the encrypted data along with at least the applicable encrypted first decryption key for the respective client. The client is able to decrypt the first decryption key and decrypt the data using the unencrypted first decryption key. The data may then be modified and securely stored on the file server as described above. The first decryption key may also be encrypted with a second encryption key having a second decryption key known to members of a group or a group server. The first encryption key encrypted with the group second encryption key is stored in the access control list so that group members can obtain access to the encrypted data stored on the file server.

33 Claims, 6 Drawing Sheets

OTHER PUBLICATIONS

Ermelindo Mauriello, TCFS: Transparent Cryptographic File System, Linux Journal #40, Aug. 1997.*

Collaborative filtering with privacy; Canny, J.; Security and Privacy, 2002. Proceedings, 2002 IEEE Symposium on 2002 pp. 45-57.*

An efficient and secure multi-server password authentication scheme using smart cards Chin-Chen Chang; Jung-San Lee; Cyberworlds, 2004 International Conference on Nov. 18-20, 2004 pp. 417-422.*

Practical techniques for searches on encrypted data Dawn Xiaoding Song; Wagner, D.; Perrig, A.; Security and Privacy, 2000. S&P 2000. Proceedings. 2000 IEEE Symposium on May 14-17, 2000 pp. 44-55.*

Blaze, M., "A Cryptographic File System for Unix", AT&T Laboratories, Holmdel, NJ 07733, presented at the First ACM Conference on Communications and Computing Security, Fairfax, VA, Nov. 3-5, 1993.

Kaufman et al., "Network Security—Private Communication in a Public World", pp. 336-338 Prentice Hall, 1995.

* cited by examiner

| $C_a$ | $\{K\}_{C_a \text{Pub Key}}$ |
|---|---|

Fig. 3a

| $C_a$ | $\{K\}_{C_a \text{Pub Key}}$ |
|---|---|
| $C_b$ | $\{K\}_{C_b \text{Pub Key}}$ |
| $C_c$ | $\{K\}_{C_c \text{Pub Key}}$ |

Fig. 3b

| $C_a$ | $\{K\}_{C_a \text{Pub Key}}$ |
|---|---|
| $C_b$ | $\{K\}_{C_b \text{Pub Key}}$ |
| $C_c$ | $\{K\}_{C_c \text{Pub Key}}$ |
| $C_d$ | $\{K\}_{C_d \text{Pub Key}}$ |

Fig. 3c

| $C_a$ | $\{K\}_{C_a \text{Pub Key}}$ |
|---|---|
| $C_b$ | $\{K\}_{C_b \text{Pub Key}}$ |
| $C_c$ | $\{K\}_{C_c \text{Pub Key}}$ |
| $C_d$ | $\{K\}_{C_d \text{Pub Key}}$ |
| $G_1$ | $\{K\}_{G_1 \text{Pub Key}}$ |

Fig. 3d

Fig. 4a $C_a\{K\}_{C_a \text{Pub Key}}\{F\}_K$

Fig. 4b $C_a\{K\}_{C_a \text{Pub Key}} \quad C_b\{K\}_{C_b \text{Pub Key}} \quad C_c\{K\}_{C_c \text{Pub Key}} \{F\}_K$

Fig. 4c $C_a\{K\}_{C_a \text{Pub Key}} \quad C_b\{K\}_{C_b \text{Pub Key}} \quad C_c\{K\}_{C_c \text{Pub Key}}$
$C_d\{K\}_{C_d \text{Pub Key}}\{F\}_K$

Fig. 4d $C_a\{K\}_{C_a \text{Pub Key}} \quad C_b\{K\}_{C_b \text{Pub Key}} \quad C_c\{K\}_{C_c \text{Pub Key}}$
$C_d\{K\}_{C_d \text{Pub Key}} \quad G_1\{K\}_{G_1 \text{Pub Key}}\{F\}_K$

Fig. 9a  $\{XK\}_{C_a \text{ Pub Key}}$

Fig. 9b
$\{XK\}_{C_a \text{ Pub Key}}$
$\{XK\}_{C_b \text{ Pub Key}}$
$\{XK\}_{C_c \text{ Pub Key}}$

Fig. 9c
$\{XK\}_{C_a \text{ Pub Key}}$
$\{XK\}_{C_b \text{ Pub Key}}$
$\{XK\}_{C_c \text{ Pub Key}}$
$\{XK\}_{C_d \text{ Pub Key}}$

Fig. 9d
$\{XK\}_{C_a \text{ Pub Key}}$
$\{XK\}_{C_b \text{ Pub Key}}$
$\{XK\}_{C_c \text{ Pub Key}}$
$\{XK\}_{C_d \text{ Pub Key}}$
$\{XK\}_{G_1 \text{ Pub Key}}$

Fig. 10a $\{XK\}_{C_a \text{ Pub Key}} \{F\}_K$

Fig. 10b $\{XK\}_{C_a \text{ Pub Key}}$  $\{XK\}_{C_b \text{ Pub Key}}$  $\{XK\}_{C_c \text{ Pub Key}} \{F\}_K$

Fig. 10c $\{XK\}_{C_a \text{ Pub Key}}$  $\{XK\}_{C_b \text{ Pub Key}}$  $\{XK\}_{C_c \text{ Pub Key}}$
$\{XK\}_{C_d \text{ Pub Key}} \{F\}_K$

Fig. 10d $\{XK\}_{C_a \text{ Pub Key}} \{XK\}_{C_b \text{ Pub Key}} \{XK\}_{C_c \text{ Pub Key}}$
$\{XK\}_{C_d \text{ Pub Key}} \{XK\}_{G_1 \text{ Pub Key}} \{F\}_K$

METHOD AND APPARATUS FOR USING NON-SECURE FILE SERVERS FOR SECURE INFORMATION STORAGE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to techniques for securely storing information on a non-secure file server and distributing the securely stored information among clients authorized to read and modify the information.

In communications networks, file servers are typically employed to store files accessible over the network. With the advancements in digital data storage and the comparatively low cost of data storage, it is now commonplace to have one or more file servers that have large data storage capacities. Networks employed to interconnect various clients with the file server are often not secure and the file server itself is often not secure. Moreover, there are certain applications in which it is desirable to store data on file servers administered by an organization independent of the clients that have a need to store the data. For example, a company may desire, for purposes of redundancy, to store their information on one file server which is secure and located within the corporate environment and another file server which is remote from and independent of the corporate enterprise. This may be done to protect against the possibility of natural or other disasters which could destroy the information stored in the secure file server on the corporate environment. Additionally, it may be more cost effective to outsource the storage function for large volume data storage. It would therefore be desirable in certain applications to be able to store data securely on a non-secure file server while being able to share the data among a number of clients that are authorized to have access to the data.

BRIEF SUMMARY OF THE INVENTION

A method and apparatus for storing data securely on an non-secure file server is disclosed. The disclosed technique prevents unauthorized users having access to the file server from obtaining intelligible information from the data stored on the file server and allows the data to be readily accessed by authorized clients or members of authorized groups. A first client desiring to store data on the non-secure file server encrypts the data with a first encryption key having an associated first decryption key. The first decryption key is encrypted, in a preferred embodiment, with a second encryption key having an associated second decryption key. The encrypted data and the encrypted first decryption key are forwarded from the first client to the file server for storage. The encrypted data is stored on the file server and the encrypted first decryption key is stored on the file server in an access control list associated with the encrypted data. In the event other clients are to be provided access to the file, the first client or another client having access to the data encrypts the first decryption key with respective encryption keys having associated decryption keys known to the respective clients and the additional encrypted first encryption keys are also stored on the non-secure file server in association with the encrypted data as entries in the access control list. In response to a request to access the encrypted data, the file server returns the encrypted data and at least the applicable encrypted first encryption key needed to decrypt the data. Alternatively, the file server returns the entire access control list. Groups of clients may be assigned a group encryption key and an associated group decryption key. The first decryption key may be encrypted using the group encryption key and the first decryption key encrypted with the group encryption key may be stored in the access control list. The first decryption key may then be decrypted by any group member or group server having access to the group decryption key. In response to a request to access the data, the file server may thus return either single entry in the access control list or the entire access control list. The requesting client or a group server decrypts the applicable encrypted first decryption key within the list to obtain the decryption key needed to decrypt the data.

Other features, aspects and advantages of the above-described techniques for securely storing data on a non-secure file server are described with particularity in the Detailed Description of the Invention which follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Consistent with the present invention a method and apparatus are disclosed for storing data securely on a non-secure file server while allowing the data to be accessed by a plurality of authorized clients and/or groups. The system is depicted generally in FIG. 1 in a simplified block diagram. The system includes a plurality of clients 12, identified as clients $C_a$–$C_n$ and a file server 14 communicatively coupled via a network 10. Additionally, certain embodiments of the system may include a group server 16 which is communicatively coupled to the network 10.

Figure 1:
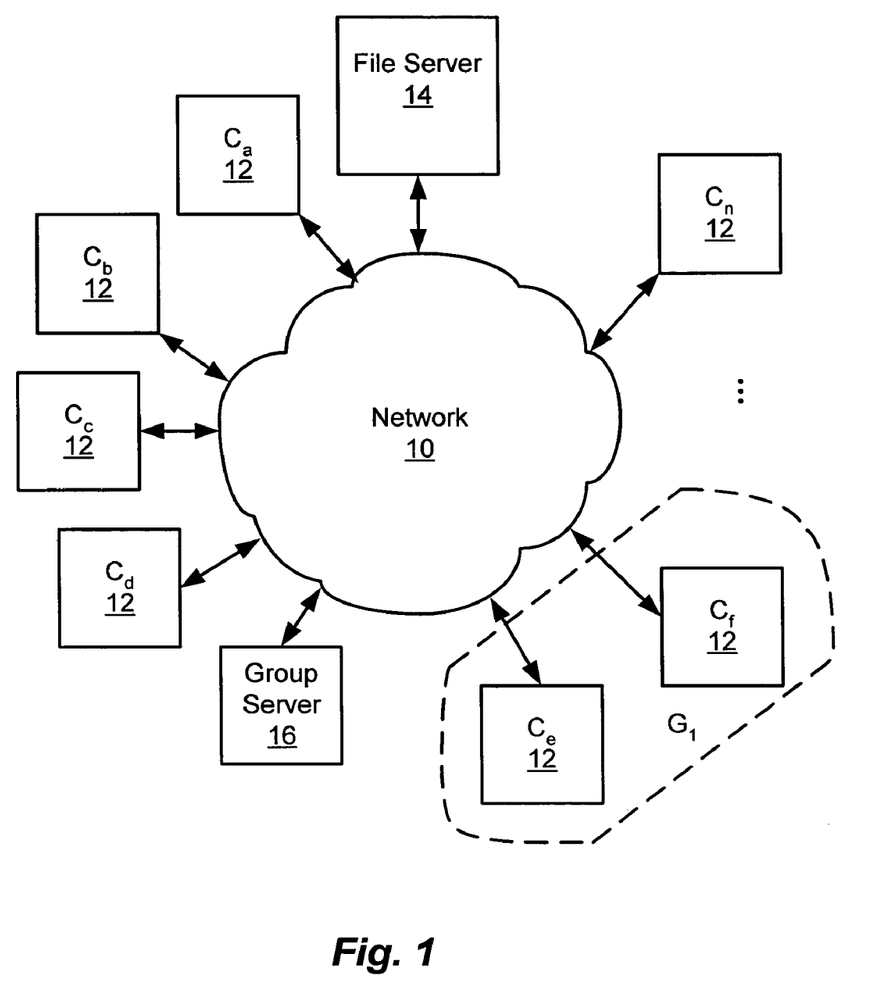
FIG. 1 is a block diagram illustrating a plurality of clients coupled to a file server over a network and operative in a manner consistent with the present invention.
Figure 2A:
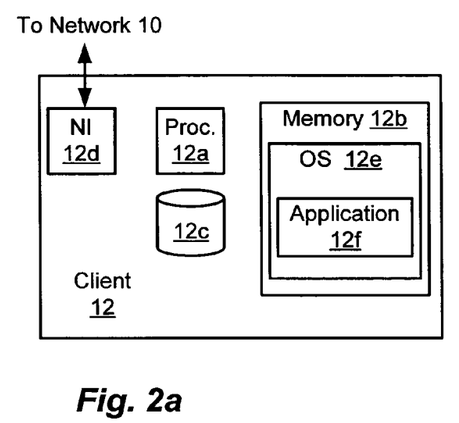
FIG. 2*a* is a block diagram of a client of the type depicted in FIG. 1.

The network 10 may comprise a local area network, a wide area network, the Internet or any other network for communicatively coupling the respective clients 12, the file server 14 and the group server 16. The clients 12 are depicted generally in FIG. 2a and may comprise a computer or processing element, a personal digital assistant (PDA), an intelligent networked appliance, a controller or other device capable of storing and retrieving information to and from the file server 14. More specifically, the clients 12 typically include a processor 12a which is operative to execute programmed instructions out of an instruction memory 12b. The instructions executed in performing the functions herein described may comprise instructions stored within program code considered part of the operating systems 12e, instructions stored within program code considered part of an application 12f or instructions stored within program code allocated between the operating system 12e and the application 12f. The memory 12b may comprise random access memory or a combination of random access memory and read only memory. The clients 12 include a network interface 12d for coupling the respective client to the network 10 and may optionally include secondary storage 12c.

Figure 2B:
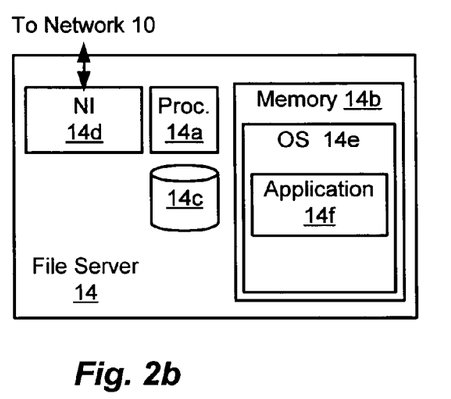
FIG. 2*b* is a block diagram of a file server of the type depicted in FIG. 1.

The file server 14 is depicted generally in FIG. 2b and may comprise a storage subsystem in the form of an intelligent hard disk array or any other data storage subsystem suitable for accessing data in response to requests issued to the file server 14 by clients communicably coupled to the file server 14 via the network 10. More specifically, the file server 14 typically includes a processor 14a which is operative to execute programmed instructions out of an instruction memory 14b. The instructions executed in performing the file server functions herein described may comprise instructions stored within program code considered part of the file server operating systems 14e, instructions stored within program code considered part of a file server application 14f or instructions stored within program code allocated between the file server operating system 14e and the file server application 14f. The memory 14b may comprise random access memory or a combination of random access memory and read only memory. The file server 14 includes a network interface 14d for coupling the respective client to the network 10 and includes secondary storage 14c for storing encrypted data forwarded from the clients 12 along with associated access control lists as discussed hereinafter in greater detail.

Figure 2C:
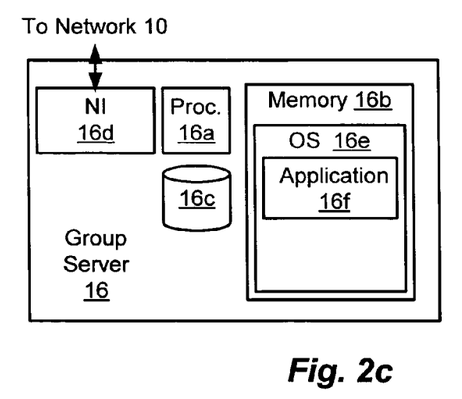
FIG. 2*c* is a block diagram of a group server of the type depicted in FIG. 1.

The group server 16 is generally depicted in FIG. 2c. The group server 16 is employed in specific embodiments which support the distribution of encrypted data among groups having a plurality of clients or other groups as members. The group server 16 typically includes a processor 16a which is operative to execute programmed instructions out of an instruction memory 16b. The instructions executed in performing the group server functions herein described may comprise instructions stored within program code considered part of the group server operating systems 16e, instructions stored within program code considered part of a group server application 14f or instructions stored within program code allocated between the file server operating system 16e and the file server application 16f. The memory 16b may comprise random access memory or a combination of random access memory and read only memory. The group server 16 includes a network interface 16d for coupling the respective client to the network 10 and includes secondary storage 16c for storing encrypted data forwarded from the clients 12 along with associated access control lists as discussed hereinafter in greater detail.

Figure 3A:
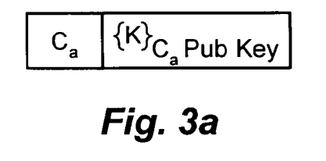
FIG. 3*a* is a table illustrating an access control list including a single list entry.

A first system for securely storing data on the file server 14 and securely distributing the data among clients 12 authorized to obtain access to the data is described below with reference to FIGS. 1, 3a–3d and 4a–4d. When a client, such as client $C_a$, desires to store data on a non-secure file server, such as the file server 14, the client $C_a$ encrypts the data with a first encryption key $K_{1e}$ having a corresponding first decryption key $K_{1d}$. For brevity, the first decryption key $K_{1d}$ appears as the key K within the braces in the Figures and the first encryption key appears as the key K outside of the braces and as a subscript. In a preferred embodiment, the first encryption key and the first decryption key comprise a single symmetric key although the first encryption key and the first decryption key may comprise public and private keys or a public key pair. For purposes of reference, the data to be stored on the file server 14 is referred to as data or file F. After encrypting the data F, the client $C_a$ encrypts the first decryption key $K_{1d}$ with a second encryption key $K_{2e}$ having a corresponding second decryption key $K_{2d}$ known to the client $C_a$. In a preferred embodiment the second encryption key $K_{2e}$ comprises the public key of a public key pair owned by the client $C_a$. Thus, the encrypted first decryption key can only be decrypted by the client 12 which owns or has access to the private key of the public key pair, which typically would be only client $C_a$. The encrypted data and the encrypted first decryption key $K_{1d}$ along with a client or group identifier are forwarded over the network 10 by the client 12 $C_a$ for receipt by the file server 14. As illustrated in FIG. 3a, the file server 14 stores the received encrypted first decryption key along with the client identifier $C_a$ in an access control list. The access control list may be stored separately from the associated encrypted data as depicted in FIG. 3a or alternatively, stored in a header along with the encrypted data file as illustrated in FIG. 4a.

Since, in the present example, the first decryption key has been encrypted with only the second encryption key having a second decryption key owned by client $C_a$ only client $C_a$ can presently obtain access to the encrypted data. The client $C_a$ 12 may access the data stored on the file server 14 as follows. The client $C_a$ issues a request to the file server 14 to access the data. In the present embodiment, the file server 14 compares the client identifier $C_a$ to the client identifiers stored within the access control list as depicted in FIG. 3a. Since the client identifier of the client 12 issuing the request to the file server 14 matches the client identifier $C_a$ in the access control list, the file server 14 retrieves the corresponding encrypted first decryption key (encrypted with the public key of client $C_a$) and returns the encrypted first decryption key along with the encrypted data to the client $C_a$. The client $C_a$, upon receipt of the encrypted first decryption key $K_{1d}$ (which was encrypted with the client $C_a$'s public key), and the encrypted data, decrypts the encrypted first decryption key $K_{1d}$ to obtain the unencrypted first decryption key and then decrypts the data F using the first decryption key. In this manner, the data F may be securely stored on the file server 14 and retrieved by the client 12 that initially stored the data. While in the above example, the file server 14 compared the client identifier of the client requesting the data to the client identifier within the access control list to identify the encrypted first decryption key to be returned, the file server 14 may return to the requesting client the entire access control list.

In many circumstances, it is desirable to be able to have one client 12 store data on the file server 14 while allowing other authorized clients 12 to access the data. The following example illustrates key distribution mechanisms which allow keys to be distributed so that encrypted data stored on a non-secure file server 14 may be accessed by a number of authorized clients 12 and group members.

Figure 3B:
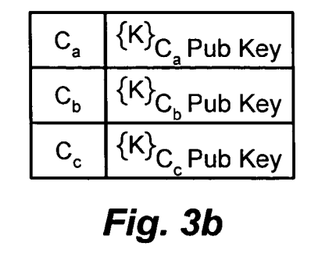
FIG. 3*b* is a table illustrating an access control list including three entries within the access control list.
Figure 4A:
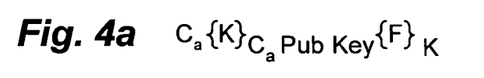
FIG. 4*a* is an illustrative message payload including a client identifier; an encrypted first decryption key and encrypted data.
Figure 4B:
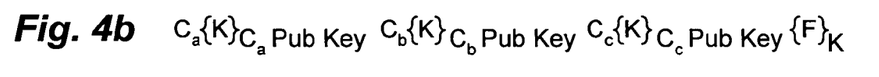
FIG. 4*b* is an illustrative message payload including plural client identifiers; an associated encrypted first decryption key for each of the respective client identifiers and encrypted data.

Referring to FIGS. 3b and 4b, and continuing with example depicted in FIGS. 3a and 4a, assume that client $C_a$ desires to permit clients $C_b$ and $C_c$ access to the encrypted data F stored on the file server 14 by the client $C_a$. In this circumstance, the client $C_a$ retrieves the access control list for the encrypted data F stored on the file server 14, obtains the first decryption key by decrypting the encrypted first decryption key and encrypts the first decryption key $K_{1d}$ with each of the public keys of the public key pairs of clients 12 $C_b$ and $C_c$. The client $C_a$ then appends the additional encrypted first decryption keys to the access control list along with the client identifiers for the respective encrypted first decryption keys as depicted in FIG. 3b. The modified access control list is forwarded by the client $C_a$ to the file server 14 and the modified access control list is stored on the file server 14 as indicated in FIG. 3b. Alternatively, the modified access control list is stored as a header in conjunction with the encrypted data F as depicted in FIG. 4b. In response to a request to access the data F from any one of the authorized clients $C_a$, $C_b$ or $C_c$, the file server compares the client identifier of the requesting client and returns the applicable encrypted first decryption key along with the encrypted data F or alternatively, returns to the requesting client the entire access control list as it then exists along with the encrypted data F. If a single encrypted first decryption key is returned, the requesting client 12 decrypts the encrypted first decryption key with the private key of its public key pair and utilizes the decrypted first decryption key to decrypt the encrypted data F. If the entire access control list is returned to the requesting client, the requesting client compares its client identifier to the client identifiers within the access control list to select the applicable encrypted first decryption key to be employed in the data decryption process. In the above-described manner, the client 12 that initially stored the encrypted data F has added to the access control list encrypted decryption key entries which allow other authorized clients to decrypt the stored data.

Figure 3C:
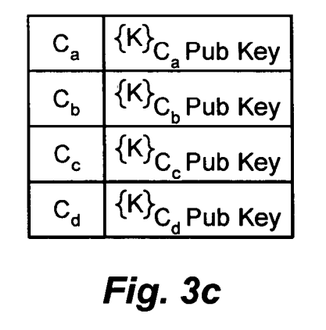
FIG. 3*c* is another example of an access control list that includes four entries within the access control list.
Figure 4C:
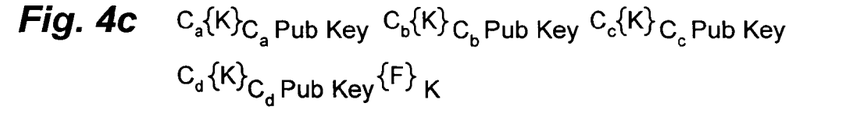
FIG. 4*c* is an illustrative message payload including plural client identifiers, an associated encrypted first decryption key for each of the respective client identifiers, and encrypted data.

Continuing with the present example, and as depicted in FIGS. 3c and 4c, clients 12 that are authorized to access the data F may authorize other clients 12 to access the data F. For example, assume that client $C_c$, which has been authorized to access the encrypted data F, desires to add client $C_d$ to the access control list so that client $C_d$ is authorized to access the encrypted data F. In this circumstance, as described above, client $C_c$ retrieves the access control list associated with the data F. Client $C_c$ then retrieves the unencrypted first decryption key by decrypting the encrypted first decryption key that had been encrypted utilizing $C_c$'s public key. Client $C_c$ then encrypts the first decryption key using client $C_d$'s public key. After encrypting the first decryption key with client $C_d$'s public key, the client identifier $C_d$ and the encrypted first decryption key for client $C_d$ is appended to the access control list and the modified access control list is forwarded to the file server 14. The modified access control list is stored on the file server 14 as depicted in FIG. 3c or alternatively, in conjunction with the encrypted data as depicted in FIG. 4c.

In response to a request to access the encrypted data F initiated by client $C_d$, the file server returns to the client $C_d$ either the applicable encrypted first decryption key which was encrypted using client $C_d$'s public key along with the encrypted data F or alternatively, the entire current access control list along with the encrypted data F as discussed above. It should be noted that the access control list may be modified by appending the new entries to the list rather than forwarding the entire modified access control list to the file server 14 for storage.

Figure 3D:
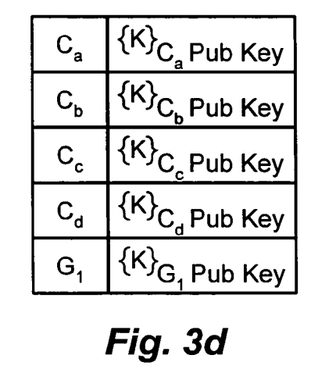
FIG. 3*d* is another example of an access control list that includes 5 entries within the access control list.
Figure 4D:
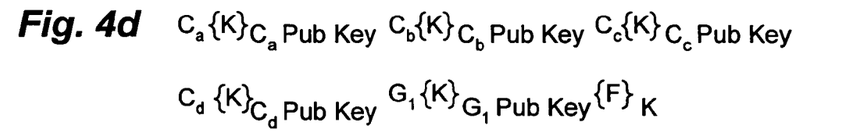
FIG. 4*d* is an illustrative message payload including plural client identifiers and a group identifier, an associated encrypted first decryption key for each of the respective client and group identifiers, and encrypted data.

Groups of clients 12 may also be authorized to obtain access to the encrypted data F stored on the file server 14. For example, referring to FIG. 1 assume that a group $G_1$ is composed of clients $C_e$ and $C_f$. Member clients 12 belonging to the group $G_1$ may be provided access to the encrypted data F stored on the file server 14 as described below. The group $G_1$ is provided with a public key pair comprising a group public key and a group private key. In a first embodiment for servicing groups of clients, each of the member clients within the group $G_1$ is provided with the group private key so that each group member can decrypt information encrypted using the group public key. A client or a client member of a group previously authorized to obtain access to the encrypted data F may add the group $G_1$ to the access control list in the manner previously described. More specifically, continuing with the prior example, assume that client $C_d$ desires to add group $G_1$ to the access control list. In this circumstance, client $C_d$ retrieves either its own encrypted first decryption key, or alternatively, retrieves the then current access control list from the file server 14. The client $C_d$ decrypts the encrypted first decryption key to obtain the unencrypted first decryption key and encrypts the first decryption key using the public key of the group $G_1$. The first decryption key encrypted with the public key of group $G_1$ is then appended to the access control list and the modified access control list is forwarded to the file server 14. Alternatively, the client $C_d$ may forward to the client server 14 the encrypted first decryption key for the group $G_1$ to be appended to the access control list as depicted in FIG. 3*d* or stored in conjunction with the encrypted data F as illustrated in FIG. 4*d*. In response to a request to access the file from a client 12 which is a member of the group $G_1$, the file server returns the applicable encrypted first decryption key for the group along with the encrypted data F or alternatively, returns the entire access control list along with the encrypted data F as discussed above. The requesting client which is a member of the group $G_1$, can decrypt the encrypted first decryption key to obtain the unencrypted first decryption key using the group private key and then decrypt the encrypted data F using the unencrypted first decryption key.

While the provision of the group private key to the group members has certain advantages in terms of processing efficiency, this approach also has certain disadvantages. In particular, if a group member ceases to be a member of the group, the public key pair for the group would need to be modified to prevent the former group member from accessing the files based upon the clients former membership in the group. Additionally, access control list entries for the group would need to be re-encrypted such that the list would contain the first decryption key encrypted with the new group public key.

In another embodiment which is operative to service requests for files from members of a group, a group server 16 depicted in FIG. 1 is employed to decrypt an encrypted copy of the first encryption key. A client 12 or group server 16 encrypts the first decryption key with the public key of the group server 16 and modifies the access control list or the header of the encrypted data stored on the file server 14 to include the group identifier and the encrypted first decryption key as depicted in FIG. 3*d* or 4*d*. In response to a request from a client 12 group $G_1$ member for access to data stored in encrypted form on the file server 14, the file server 14, as described above, returns the encrypted data to the requesting client 12 group $G_1$ member along with either the encrypted first decryption key (encrypted with the group server public key) for the group $G_1$ or alternatively, returns to the requesting client 12 group member the entire access control list. The requesting client 12, upon receipt of the encrypted key or the access control list, forwards at least the encrypted first decryption key for the group $G_1$ (encrypted with the group server 16 public key) to the group server 16. The group server 16 then determines whether the client that forwarded the encrypted first decryption key for decryption is a member of the respective group. If the client that forwarded the request is not a member of the group, the group server 16 does not proceed with the decryption of the encrypted first decryption key. If the client that forwarded the request is a member of the group, the group server 16 decrypts the encrypted first decryption key with the group server private key to obtain the unencrypted first decryption key. The group server 16 then forwards the first decryption key to the group member via a secure channel. The secure channel may comprise a physically secure channel or alternatively may comprise an encrypted message forwarded to the respective client over a non-secure communications link. For example, the group server 16 may encrypt the first decryption key with the public key of the respective client 12 or alternatively with a symmetric key shared between the group server 16 and the respective client 12. If the first decryption key is encrypted with the public key of the client 12, only the client 12 having the corresponding private key can decrypt the encrypted first decryption key which was encrypted with respective clients public key. Upon receipt and decryption of the encrypted first decryption key, the client that initiated the request for data can utilize the unencrypted first decryption key to decrypt the encrypted data retrieved from the file server 14. The utilization of a group server 16 to perform decryption and forwarding of the first decryption key to the client group member that requested data from the file server 14 avoids the need to assign a new public key pair in the event that a client ceases to be a group member and additionally, avoids the need to update the access control list should a group member exit the group. It should also be noted that a symmetric key may be employed between the group server 16 and a client group member to establish the secure channel over the non-secure communications link.

Figure 5:
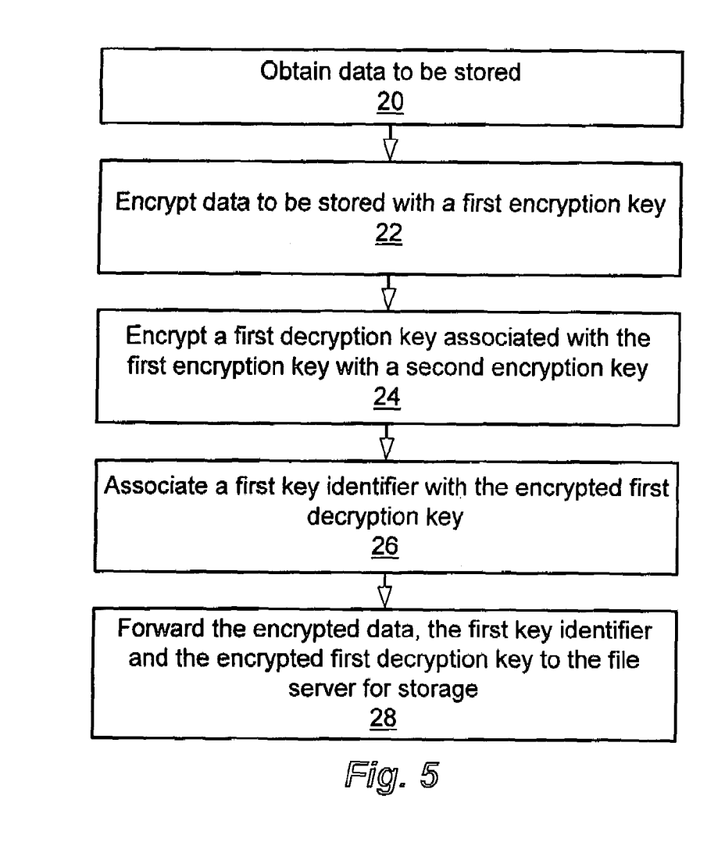
FIG. 5 is a flow diagram illustrating a method employed at a client for encrypting data and an associated decryption key for storage on the file server of FIG. 1.

The method employed at a client 12 to store data on the non-secure file server 14 while using non-encrypted client and group identifiers to identify encrypted first decryption keys in the access control list is illustrated in FIG. 5. Referring to FIG. 5, the client 12 (or group member) first obtains the data to be stored on the non-secure file server 14 as illustrated in step 20. The data may comprise a file generated by the client, such as a text file or any other file generated by the client 12, a database, information obtained by the client 12 from another client, or any other form of information or data that the client desires to store on the non-secure file server 14. The client 12 next encrypts the data to be stored on the file server 14 with a first encryption key having an associated first decryption key as illustrated in step 22. The client 12 also encrypts the first decryption key with a second encryption key having an associated second decryption key known to the respective client or group as depicted in step 24. A first key identifier is associated with the encrypted first decryption key as shown in step 26. In the event the client 12 is storing the data for its own decryption, the key identifier would correspond to the respective client 12 identifier; i.e. if the client $C_1$ is storing the encrypted data on the non-secure file server for its own retrieval, the client $C_1$ associates the key identifier $C_1$ in unencrypted form with the encrypted first decryption key encrypted with the client $C_1$ second encrypted key. The client $C_1$ may encrypt the first encryption key with its own public key and use its own client identifier $C_1$ as the key identifier. In the event the data is first to be stored in the file server 14 on behalf of a group $G_1$, the group member or group server that is storing the data on the file server 14 encrypts the first decryption key with a second encryption key having an associated second decryption key which is either published to the group members or alternatively, retained by the group server 14. The client 12 or group server 16 associates the group key identifier $G_1$ with the encrypted first decryption key and forwards the key identifier, the encrypted first decryption key and the encrypted data to the file server 14 for storage as illustrated in step 28.

Figure 6:
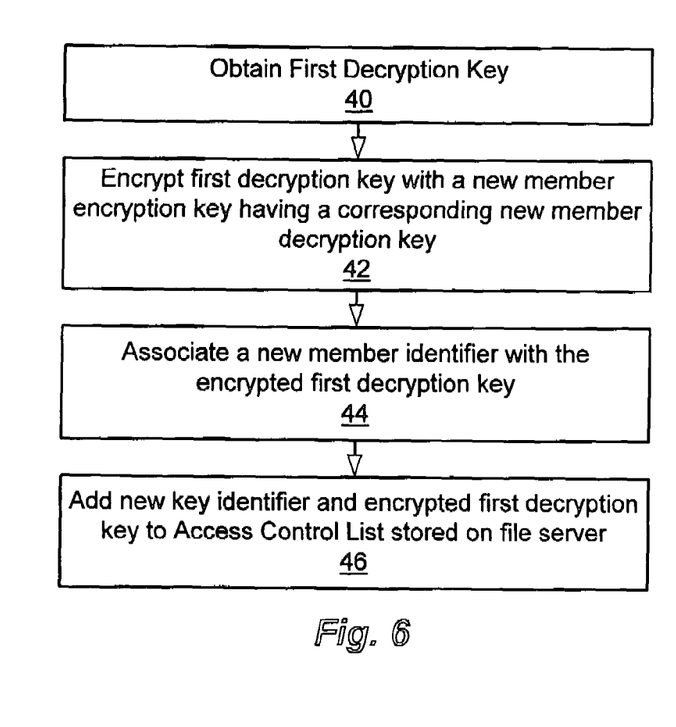
FIG. 6 is a flow diagram illustrating a method employed at a client for modifying an access control list stored on the file server of FIG. 1.

FIG. 6 illustrates the method for modifying the access control list that is employed at a client (or group server if applicable) authorized to obtain access to the encrypted data stored on the non-secure file server 14. Assume that a first client 12 that is authorized to access the stored data desires to authorize a second client to access the stored data. As depicted in step 40, the first client 12 that is authorized to access the stored data obtains the encrypted first decryption key associated with its key identifier. This may occur in a number of ways. If the first client 12 is in possession of the first decryption key the first client need not obtain the encrypted first decryption key from the file server 14. In the event the first client 12 does not have the encrypted first decryption key in its possession, or as a default, the first client 12 may request that the encrypted first decryption key associated with the first client's key identifier be returned from the file server 14. Alternatively, the first client 12 may request that the then existing access control list (which includes the encrypted first encryption key encrypted with the first clients second encryption key) be returned from the file server 14. The objective of this step is simply to obtain at the first client a copy of the unencrypted first encryption key. If the first client 12 retrieves an encrypted copy of the first encryption key from the file server 14, the client 12 decrypts the respective encrypted first decryption key with its second decryption key to obtain the unencrypted first decryption key. As previously discussed, the second encryption and decryption keys are preferably the respective public and private keys of the public key pair owned by the respective client 12. Alternatively, symmetric keys may be employed which are shared among the clients 12 that are authorized to access the stored data and authorized to modify the access control list.

After obtaining the unencrypted first decryption key, the first client 12 that desires to modify the access control list obtains a second encryption key of a second client 12 to be provided access to the stored data. The second client 12 second encryption key has an associated second client second decryption key. As discussed above, the second client 12 second encryption key and second decryption key are preferably public and private keys of a public key pair owned by the added client. The first decryption key is encrypted by the first client 12 using the second encryption key of the second client as depicted in step 42. The second client key identifier is then associated with the second client's encrypted first decryption key as depicted in step 44. Thereafter, the second client key identifier and the second client's encrypted first decryption key are appended to the access control list as illustrated in step 46. This information may be appended to the access control list in a number of ways. For example, the access control list may be retrieved by the first client and the first client may append the second client key identifier and encrypted first decryption key information to the prior access control list to form the modified access control list. Alternatively, the new key identifier and encrypted first decryption key may be forwarded to the file server 14 and such information may be added to the access control list by the file server 14 in response to a request issued by the first client. Finally, if the access control list is stored as a header to the encrypted data stored on the file server 14, the header is modified to correspond to the modified access control list. Thus, any client that is authorized to access the data stored on the non-secure file server 14 may modify the access control list to authorize other clients or groups to access the stored data.

Figure 7:
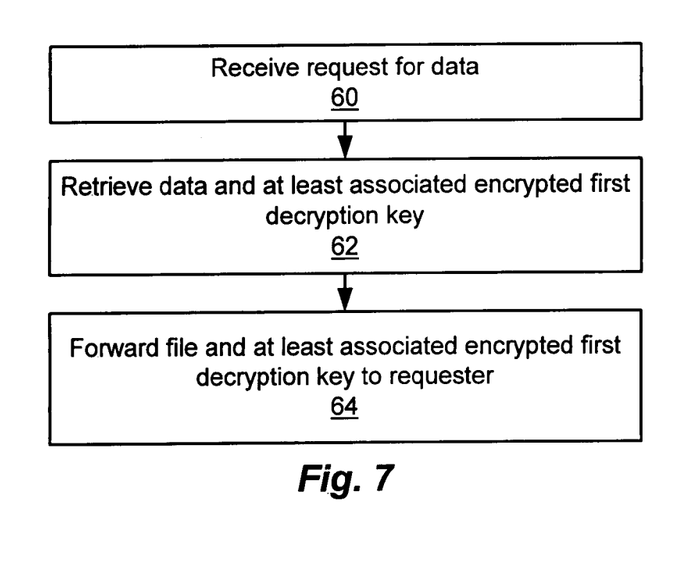
FIG. 7 is a flow diagram illustrating a method employed at the file server of FIG. 1 for responding to a request for data from a client.

FIG. 7 illustrates the operation of the file server 14 in response to a request for stored data from a client 12 authorized to access such data. As indicated in step 60, a client authorized to access data stored on the non-secure file server 14 issues a request to the file server 14 to retrieve the data. In response, the file server 14 retrieves the encrypted data and at least the encrypted first decryption key associated with the requesting client 12 as shown in step 62. More specifically, the file server 14, upon receipt of the request for data, may retrieve the data along with the relevant encrypted first decryption key by retrieving from the access control list the key associated with the client or group identifier that issued the request. By retrieving only the needed key with the encrypted data and forwarding only the needed key to the requesting client 12, network bandwidth is conserved. Alternatively, the file server 14, in response to a request for data, may retrieve the entire access control list and return the entire access control list and the encrypted data to the client, In either case, the file server 14 forwards to the client 12 that issued the request for the data the encrypted data along with at least the relevant encrypted first decryption key as depicted in step 64.

Prior to forwarding the encrypted data and the encrypted first decryption key to a requesting client the file server 14 may perform a test to authenticate the client and ascertain whether the requesting client is included on the access control list. If the client is not included on the access control list, the file server may decline to return to the requesting client the encrypted data and/or the encrypted first decryption keys.

Figure 8:
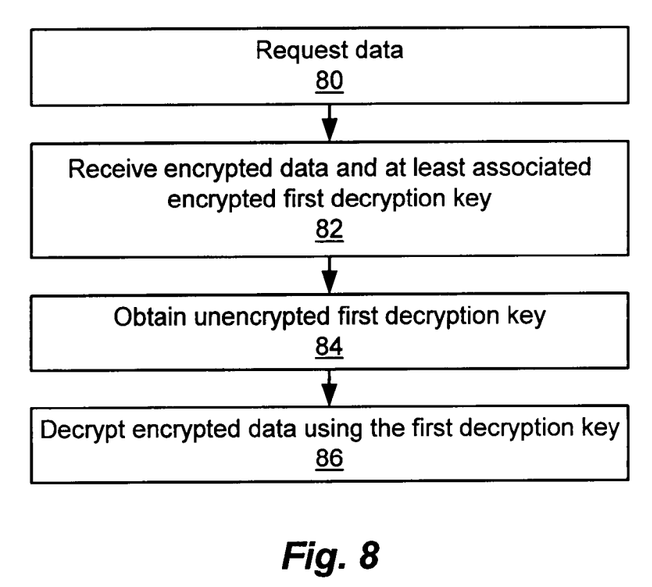
FIG. 8 is a flow diagram illustrating a method employed at a client for decrypting encrypted data retrieved from the file server of FIG. 1.

FIG. 8 illustrates the operation of a client 12 that desires to retrieve data stored on the non-secure file server 14. As illustrated at step 80, the client 12 (e.g. client $C_b$ or a group member such as $C_e$ in group $G_1$) that desires to retrieve data from the file server 14 issues a request to the file server for the particular data. Typically, the request will be in the form of a request to access data having a known file name. As illustrated in step 82, in response to the request, the requesting client receives from the file server 14 at least one encrypted decryption key for decrypting the encrypted data along with the encrypted data. As discussed above with respect to FIG. 7, the client 12 that issued the request may receive a single encrypted first decryption key (if the file server parses the request to identify the needed key from the received access control list) or alternatively, the full access control list (in which case, the requesting client identifies the needed key). Additionally, as discussed above, if the requesting client is a member of a group, the encrypted key or access control list, as applicable, may be forwarded to the group server 16 for decryption of the relevant encrypted first decryption key and the unencrypted first decryption key securely communicated to the respective group member. The requesting client 12 or group member thus obtains an unencrypted copy of the first decryption key as depicted in step 84 and the unencrypted first decryption key is utilized to decrypt the encrypted data as shown in step 86.

In the embodiments described above, the client and group identifiers stored in the access control list or data header on the file server 14 are stored in unencrypted form or, as referred to in the trade, "in the clear". Thus, the file server 14 and users having access to the file server can access the identity of the clients and groups that are authorized to access given data even if such users cannot access the encrypted data and encrypted key associated with the respective identifiers. In certain environments it may be desirable to preclude the file server and unauthorized users from obtaining even client and group identifying information. To prevent access to client and group identifiers while still permitting secure storage of data on a non-secure file server, variations of the above-described techniques are employed. These embodiments are described with respect to access control list examples illustrated in FIGS. 9a through 9d and message payload data illustrated in FIGS. 10a through 10d.

Figure 9A:
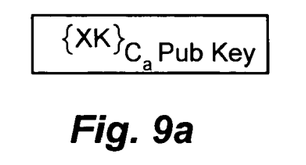
FIG. 9a depicts an access control list including a single access control list entry.
Figure 10A:
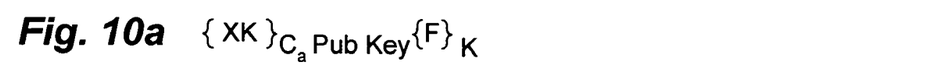
FIG. 10a is an illustrative message payload including a check value and a first decryption key and data encrypted with a first encryption key.

By way of example, assume that client $C_a$ desires to store data on the non-secure file server 14. The client $C_a$ encrypts the data with a first encryption key having an associated first decryption key. As discussed above, the first encryption and decryption keys are preferably a symmetric key, but a public key pair may be employed. The client $C_a$ appends the unencrypted first decryption key "K" to an unencrypted client identifier or unencrypted check value "X" and encrypts the data stream {XK} with a second encryption key having an associated second decryption key known to client $C_a$. The second encryption key in a preferred embodiment is the public key of a public key pair owned by the client $C_a$. The value X may be the client identifier (or group identifier) for the client $C_a$ storing the data or alternatively, a secret value or a value known to the client $C_a$. For purposes of illustration in the present example it will be assumed that the value X is the client identifier $C_a$ and the client identifier occupies a predetermined number of bytes. The encrypted data stream along with the encrypted data is forwarded by the client $C_a$ to the file server 14. The encrypted data stream {XA} is stored in an access control list as depicted in FIG. 9a and associated with the stored encrypted data. Alternatively, the encrypted data stream is stored as a header to the encrypted data as depicted in FIG. 10a.

In response to a request from the client $C_a$ to read the data stored on the file server 14, the file server returns the access control list for the encrypted data along with the encrypted data. The client $C_a$ then attempts to decrypt each encrypted data stream in the access control list with its second decryption key, which, in the present example, comprises the private key of client $C_a$. In the initial example depicted in FIG. 9a the access control list includes a single entry. After decrypting the encrypted data stream with client $C_a$'s second decryption key, client $C_a$ strips off an initial predetermined number of bytes from the decrypted data stream and compares the initial byte value to the client identifier for the client $C_a$. If the values compare, the data which follows is the unencrypted first decryption key. The first decryption key is then used to decrypt the encrypted data that was retrieved from the file server. If the values do not compare, the remaining encrypted data streams in the access control list are decrypted using the respective second decryption key to determine which data stream includes the first decryption key that was encrypted with the respective client's second encryption key. Upon decrypting the proper data stream, the first encryption key is used to decrypt the encrypted data. It is noted that the present embodiment in which group identifiers are not in the clear is more compute intensive since the encrypted data streams must be sequentially decrypted to locate the data stream that was initially encrypted using the respective client's second encryption key. Additionally, as discussed hereinafter, the situation is more complex when the access control list includes an encrypted data stream which may only be decrypted by a group server.

Figure 9B:
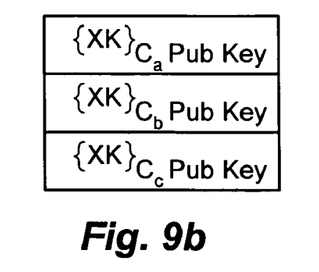
FIG. 9b depicts an access control list including three access control list entries.
Figure 9C:
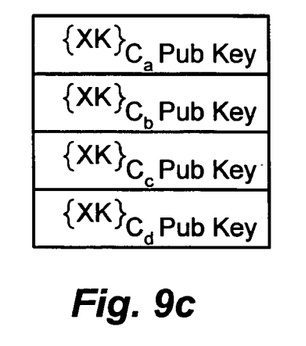
FIG. 9c depicts an access control list including four access control list entries.
Figure 10B:
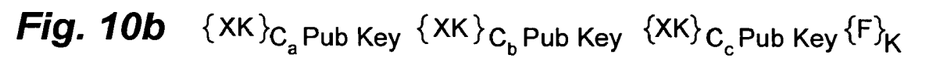
FIG. 10b is an illustrative message payload including plural encrypted check values and first decryption keys and data encrypted with the first encryption key.
Figure 10C:
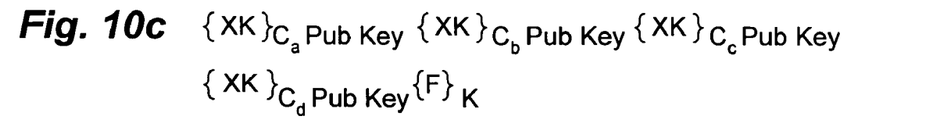
FIG. 10c is another illustrative message payload including plural encrypted check values and first decryption keys and data encrypted with the first encryption key.

By way of further example, assume that client $C_a$ desires to authorize clients $C_b$ and $C_c$ to access the encrypted file. This is accomplished by modifying the access control list. More particularly, the client $C_a$ obtains the first decryption key. If the first decryption key has not been retained within the client $C_a$, client $C_a$ retrieves the access control list from the file server 14 and decrypts the entries in the access control list with client $C_a$'s second decryption key until the entry encrypted with client $C_a$'s second encryption key is located. After decrypting the data stream {XK} that includes the value X which corresponds to the client's identifier, the corresponding first decryption key is used by the client $C_a$ to generate new data stream entries for inclusion in a modified access control list. In particular, referring to FIG. 9b, the first decryption key (K) is appended to the client identifier for client $C_b$ (X) and the combined data stream is encrypted with the second encryption key for the client $C_b$. Additionally, the first decryption key (K) is appended to the client identifier for client $C_c$ (X) and the combined data stream is encrypted with the second encryption key for the client $C_c$. The encrypted data streams are then added to the access control list as shown in FIG. 9b or included in the header of the encrypted data as illustrated in FIG. 10b.

In the event one of the clients 12 authorized to access the data stored in encrypted form on the file server 14 issues a request to the file server 14 to access the data, the file server returns the entire access control list along with the encrypted data. The requesting client 12 decrypts each successive encrypted data stream and tests the decrypted value X against its own client identifier (or check value) to identify the first decryption key that was encrypted with the respective client's second encryption key. The first decryption key is then used to decrypt the encrypted data.

Any client 12 that is authorized to access the data stored on the file server 14 can authorize another client 12 to access the stored data. For example, referring to FIGS. 9c and 10c, any of clients $C_a$, $C_b$ and $C_c$ can modify the access control list to authorize client $C_d$ to access the stored data as described above with respect to FIGS. 9b and 10b.

Figure 9D:
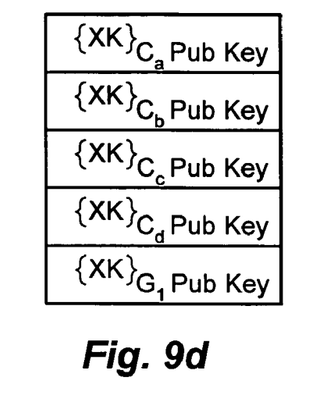
FIG. 9d depicts an access control list including five access control list entries.
Figure 10D:
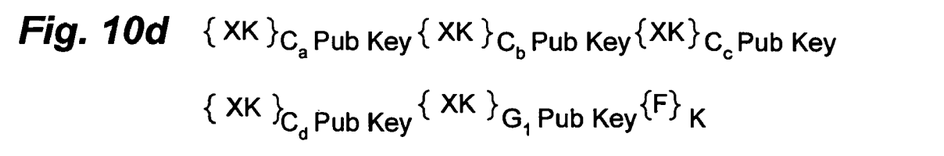
FIG. 10d is another illustrative message payload including plural encrypted check values and first decryption keys and data encrypted with the first encryption key.

Groups of clients may also be authorized to access data stored on the non-secure file server 14 without using unencrypted group identifiers. Assume that client $C_c$ desires to authorize group $G_1$ to access the encrypted data stored on the file server 14. In such event, client $C_c$ obtains the first decryption key as discussed above. Client $C_c$ then appends the first decryption key to the group identifier $G_1$ to form a data stream, encrypts the data stream with a second encryption key which has a corresponding second decryption key owned by the group $G_1$. In a preferred embodiment, the second encryption key comprises the public key of the group $G_1$ and the second decryption key comprises the private key of the group $G_1$. The second decryption key for the group $G_1$ may be distributed among the members of the group or alternatively, retained by a group server such as group server 16. The encrypted data stream is added to the access control list as depicted in FIG. 9d or alternatively, included the header of the encrypted data as depicted in FIG. 10d. In the event the group $G_1$ members are provided with the group $G_1$ second decryption key, a group member retrieves the stored data as follows. Assume group $G_1$ includes clients $C_e$ and $C_f$. In the event client $C_f$ issues a request to the file server 14 for the stored data, the file server 14 returns the entire access control list (e.g. the access control list depicted in FIG. 10d) along with the encrypted data. Client $C_f$ may not be authorized to access the file individually, but may be authorized to access the data as a member of the group $G_1$. In such event, the client $C_f$ attempts to decrypt the data streams within the retrieved access control list using its client second decryption key. In such event, none of the values X will match the client $C_f$ identifier following decryption of the data streams. The client $C_f$ may then attempt to decrypt the encrypted data streams within the access control list using the group $G_1$ second encryption key. This effort will result in the identification of the group identifier $G_1$ within one of the decrypted data streams. Upon identifying the group identifier $G_1$ client $C_f$ uses the associated first decryption key to decrypt the encrypted data.

To avoid the problems discussed above with respect to the distribution of the group second decryption key, instead of distributing the group second decryption key to the group members, the key may be retained by the group server 14. If the client $C_f$ is unable to decrypt an encrypted data stream within the access control list using its own second decryption key (e.g. the client $C_f$ private key), client $C_f$ forwards the access control list to the group server 14 which attempts to decrypt the encrypted data streams within the access control list using the group server second decryption key (e.g. the group $G_1$ private key). Upon recognizing the group $G_1$ identifier, the group server extracts the first decryption key from the applicable data stream and forwards the first decryption key via a secure channel to the client $C_f$ that issued the initial request for the data stored on the non-secure file server 14. The first decryption key may be forwarded over a secure physical channel or alternatively, may be encrypted with an encryption key having an associated decryption key known to the client $C_f$. The client $C_f$ may then utilize the first decryption key obtained from the group server 16 to decrypt the encrypted data.

While in the above example, client $C_f$ attempted to decrypt the data streams within the retrieved access control list before forwarding the list to the group server 16, it should be appreciated that the client $C_f$ may forward the access control list initially to the group server 14 and not initiate decryption of data streams within the retrieved access control list until results are first received from the group server 16. Alternatively, the client $C_f$ may initiate decryption of the data streams within the retrieved access control list with its own second decryption key while forwarding the access control list to the group server 16 for decryption of the data streams within the access control list in parallel. In this manner, the average time to obtain the first decryption key, and thus, to decrypt the encrypted data may be reduced.

The above described examples illustrate the use of encrypted client and group identifiers. As mentioned above, a password or known check value may be employed as the value X to which the first decryption key is appended. The known value will only be generated by a client decrypting the data stream with a second decryption key for which the respective data stream was encrypted using the corresponding second encryption key.

While in the above-described embodiments, the file server 14 transmits encrypted information to a client in response to a request issued by the respective client, it should be appreciated that the file server may transmit such information in the absence of a specific request from a particular client. For example, the file server 14 may periodically transmit encrypted information along with one or more of the access control list entries to one or more of the clients 12. Additionally, such transmission may occur on a non-periodic basis in response to specified events.

Those skilled in the art should readily appreciate that computer programs operative to perform the functions herein described can be delivered to a client, or file server or group server in many forms; including, but not limited to: (a) information permanently stored in a non-writable storage media (e.g. read-only memory devices within a computer such as ROM or CD-ROM disks readable by a computer I/O attachment); (b) information alterably stored on writable storage media (e.g. floppy disks, tapes, read/write optical media and hard drives); or (c) information conveyed to a computer through a communication media, for example, using baseband or broadband signaling techniques, such as over computer or telephone networks via a modem. In addition, it should be appreciated that the presently described methods may be implemented in software executing out of a memory on respective client, file or group server processors. Alternatively, the presently described functions may be embodied in whole or in part using hardware components such as Application Specific Integrated Circuits (ASICs), state machines, controllers or other hardware components or devices, or a combination of hardware components and software processes without departing from the inventive concepts herein described.

Those of ordinary skill in the art should further appreciate that variations to and modifications of the above-described methods and systems for granting access to a computer resource may be made without departing from the inventive concepts disclosed herein. Accordingly, the invention should be viewed as limited solely by the scope and spirit of the appended claims.

What is claimed is:

1. A method of operation at a file server, the method comprising:

storing (i) information encrypted with a first encryption key and (ii) an access control list usable by said file server to control access to said encrypted information, said access control list including an entry that includes an identifier for a client authorized to at least read said encrypted information and a first decryption key encrypted with a second encryption key, wherein said first decryption key is usable to decrypt said encrypted information, and wherein said second encryption key is associated with a second decryption key that is usable to decrypt said encrypted first decryption key and that is accessible to said client, and in response to a request from said client, transmitting to said client said encrypted information and said entry.

2. The method of claim 1 wherein transmitting comprises transmitting to said client said access control list.

3. The method of claim 1 wherein said first encryption key and said first decryption key are symmetric.

4. The method of claim 1 wherein said first encryption key comprises one of a public key and a private key of a first public/private key pair and said first decryption key comprises the other of said public key and said private key of said first public/private key pair.

5. The method of claim 1 wherein said identifier includes one of an unencrypted identifier and an encrypted identifier.

6. The method of claim 1 wherein said entry includes said first decryption key combined with a check value to form a data stream, wherein said data stream is encrypted with a said second encryption key; and transmitting comprises transmitting to said client said encrypted information and said access control list.

7. The method of claim 6 wherein said check value comprises a value known to said client.

8. The method of claim 6 wherein said check value comprises said client identifier.

9. The method of claim 6 wherein said check value comprises a group identifier that identifies a group of which said client is a member.

10. A method for securely storing information on a file server and distributing the stored information, said method comprising:

encrypting information at one of a plurality of clients in communication with said file server, said information being encrypted with a first encryption key having an associated first decryption key that is usable to decrypt said encrypted information;

encrypting said first decryption key with a second encryption key for each of said plurality of clients authorized to at least read said information, wherein each respective one of said second encryption keys has a corresponding second decryption key that is usable to decrypt said respective encrypted first decryption key and that is retained by the respective one of said plurality of clients;

storing said encrypted information on said file server and storing on said file server said encrypted first decryption keys as a plurality of entries within an access control list, wherein each one of said entries is associated with one of said plurality of clients;

forwarding to at least a selected one of said plurality of clients said encrypted information and at least one of said entries in response to a request received at said file server from said selected one of said plurality of clients;

decrypting said encrypted first decryption key contained in said at least one of said entries utilizing the second decryption key corresponding to the second encryption key for the respective entry; and decrypting said encrypted information using said first decryption key to obtain said information.

11. The method of claim 10 wherein said request includes a client identifier associated with said selected one of said plurality of clients, said entries each include a client identifier associated with one of said plurality of clients, and wherein forwarding includes forwarding to at least said selected one of said plurality of clients the entry including the client identifier that is associated with the client identifier contained within said request.

12. The method of claim 10 wherein forwarding comprises forwarding to said selected one of said plurality of clients said encrypted information and said access control list.

13. The method of claim 10 wherein said first encryption and decryption keys are symmetric.

14. The method of claim 10 wherein said second encryption and decryption keys are symmetric.

15. The method of claim 10 wherein said first encryption key comprises one of a public key and a private key of a first public/private key pair and the first decryption key comprises the other of said public key and said private key of said first public/private key pair.

16. A method for storing information securely on a file server for access by members of a group, said method comprising:
    identifying the members of said group, wherein said group has a group identifier,
    encrypting information with a first encryption key having an associated first decryption key that is usable to decrypt said encrypted information;
    encrypting said first decryption key with a group encryption key having an associated group decryption key for decrypting data encrypted with said group encryption key;
    storing said encrypted information on said file server and storing said encrypted first decryption key on said file server within an access control list associated with said encrypted information and containing, at least at some times, a plurality of encrypted first decryption keys, and
    in response to a request received at said file server from one of said members of said group, forwarding to said one of said members of said group said encrypted information and at least said first decryption key encrypted with said group encryption key.

17. A method for accessing information securely stored on a file server for access by members of a group, said method comprising:
    identifying the members of said group, wherein said group has a group identifier,
    encrypting information with a first encryption key having an associated first decryption key that is usable to decrypt said encrypted information;
    encrypting said first decryption key with a group encryption key having an associated group decryption key for decrypting data encrypted with said group encryption key;
    storing said encrypted information on said file server and storing said encrypted first decryption key on said file server within an access control list associated with said encrypted information and containing, at least at some times, a plurality of encrypted first decryption keys;
    in response to a request received at said file server from one of said members of said group, forwarding to said one of said members of said group said encrypted information and at least said encrypted first decryption key encrypted with said group encryption key;
    in a first decrypting, decrypting said encrypted first decryption key with said group decryption key to obtain said first decryption key; and
    in a second decrypting, decrypting said encrypted information using said first decryption key to obtain said information.

18. The method of claim 17 wherein said method further includes distributing said group decryption key to said members of said group and said first decrypting comprises decrypting the encrypted first decryption key by said one of said members of said group using the distributed group decryption key.

19. The method of claim 17 wherein said first decrypting comprises:
    forwarding said encrypted first decryption key to a group server associated with said group identifier;
    decrypting said encrypted first decryption key at said group server using said group decryption key; and
    forwarding said first decryption key to said one of said group members.

20. The method of claim 19 wherein forwarding said first decryption key to said one of said group members comprises forwarding the first decryption key to said one of said group members over a secure channel.

21. The method of claim 20 wherein said secure channel is a physically secure channel.

22. The method of claim 20 wherein said secure channel comprises a non-secure communications path and forwarding the first decryption key to said one of said group members over a secure channel comprises:
    encrypting said first decryption key with a third encryption key having an associated third decryption key known to said one of said group members;
    forwarding to said one of said group members said encrypted first decryption key encrypted with said third encryption key; and
    decrypting by said one of said group members, said encrypted first decryption key encrypted with said third encryption key using said third decryption key.

23. The method of claim 22 wherein said third encryption key comprises a public key of a member public/private key pair and wherein said third decryption key comprises the member private key of said member public/private key pair.

24. The method of claim 22 wherein said third encryption and decryption keys are symmetric.

25. The method of claim 17 wherein said first encryption and decryption keys are symmetric.

26. The method of claim 17 wherein said first encryption key comprises one of a public key and a private key of a first public/private key pair and the first decryption key comprises the other of said public key and said private key of said first public/private key pair.

27. A method for accessing information stored securely on a file server, the method comprising:
  forwarding to said file server a request for information from a client;
  in response to said request, receiving from said file server said information encrypted with a first encryption key having an associated first decryption key that is usable to decrypt said encrypted information and at least one access control list entry associated with a client authorized to at least read said information, said received at least one entry including said first decryption key encrypted with a second encryption key having an associated second decryption key that is usable to decrypt said encrypted first decryption key and that is accessible to said client;
  decrypting said encrypted first decryption key using said second decryption key to obtain said first decryption key; and
  decrypting said encrypted information using said first decryption key.

28. The method of claim 27 wherein said first encryption and decryption keys are symmetric.

29. The method of claim 27 wherein said first encryption key comprises one of a public key and a private key of a first public/private key pair and the first decryption key comprises the other of said public key and said private key of said first public/private key pair.

30. The method of claim 27 wherein said second encryption key comprises a public key of a member public/private key pair and said second decryption key comprises the private key of said member public/private key pair.

31. A computer program product including a computer readable medium, said computer readable medium having a file server computer program stored thereon, said file server computer program for execution in a computer and comprising:
  program code for storing on said file server information encrypted with a first encryption key having a corresponding first decryption key that is usable to decrypt said encrypted information;
  program code for storing on said file server an access control list, said access control list including at least one entry, said at least one entry including said first decryption key encrypted with a second encryption key associated with one of a plurality of clients authorized to at least read said information and having access to a second decryption key associated with said second encryption key and usable to decrypt said encrypted first decryption key; and
  program code for transmitting to said one of said plurality of clients said encrypted information and said at least one entry.

32. A computer data signal, said computer data signal including a computer program for use in accessing encrypted information stored on a file server, said computer program comprising:
  program code for storing on said file server information encrypted with a first encryption key having a corresponding first decryption key that is usable to decrypt said encrypted information;
  program code for storing on said file server an access control list, said access control list including at least one entry, said at least one entry including said first decryption key encrypted with a second encryption key associated with one of a plurality of clients authorized to at least read said information and having access to a second decryption key associated with said second encryption key and usable to decrypt said encrypted first decryption key; and
  program code for transmitting to said one of said plurality of clients said encrypted information and said at least one entry.

33. Apparatus for accessing encrypted data stored on a file server, the apparatus comprising:
  means for storing on said file server information encrypted with a first encryption key having a corresponding first decryption key that is usable to decrypt said encrypted information;
  means for storing on said file server an access control list, said access control list including at least one entry, said at least one entry including said first decryption key encrypted with a second encryption key associated with one of a plurality of clients authorized to at least read said information and having access to a second decryption key associated with said second encryption key that is usable to decrypt said encrypted first decryption key; and
  program code for transmitting to said one of said plurality of clients said encrypted information and said at least one entry.

* * * * *